United States Patent [19]
Wada

[11] Patent Number: 6,072,582
[45] Date of Patent: Jun. 6, 2000

[54] DISPLACEMENT MEASURING METHOD AND APPARATUS USING INTERFERENCE OF TWO BEAMS

[75] Inventor: Hiroaki Wada, Shiga-ken, Japan

[73] Assignee: Murata Manufacturing Co., Ltd., Nagaokakyo, Japan

[21] Appl. No.: 09/156,628

[22] Filed: Sep. 18, 1998

[30] Foreign Application Priority Data

Sep. 25, 1997 [JP] Japan .................................... 9-279786

[51] Int. Cl.$^7$ ...................................................... G01B 9/02
[52] U.S. Cl. ......................... 356/358; 356/349; 356/359
[58] Field of Search .................................. 356/349, 357, 356/359, 356

[56] References Cited

U.S. PATENT DOCUMENTS

5,486,924  1/1996  Lacey ...................................... 356/357

*Primary Examiner*—Robert H. Kim
*Attorney, Agent, or Firm*—Burns, Doane, Swecker & Mathis, LLP

[57] ABSTRACT

A displacement measuring method and apparatus divides incident light into two beams. One beam is reflected by a surface to be measured, and another beam is reflected by a reference surface. The image of interference fringes composed of light reflected by the surface to be measured and light reflected by the reference surface is obtained as a monochromatic-light image and a chromatic-light image which are simultaneously photographed. The position of a zero-order interference fringe is detected based on the maximum brightness position of the chromatic-light image, and the displacement of a point to be measured is found based on the position of a interference fringe in the monochromatic-light image which corresponds to that point, and a position in the monochromatic-light image corresponding to the zero-order interference fringe.

14 Claims, 6 Drawing Sheets

DISPLACEMENT MEASURING METHOD AND APPARATUS USING INTERFERENCE OF TWO BEAMS

This application corresponds to Japanese Patent Application No. 9-279786, filed on Sep. 25, 1997, which is hereby incorporated by reference in its entirety.

BACKGROUND OF THE INVENTION

1. Field of the Invention

The present invention relates to a displacement measuring method and apparatus using interference of two beams to measure a displacement or asperity on a measurement surface.

2. Description of the Related Art

Double-beam interferometers are known. These apparatus are used for measuring a step-height difference on a measurement surface. The double-beam interferometer divides coherent light into two beams having the same intensity, and allows one beam to be incident on a reference surface and another beam to be incident on a measurement surface, to produce two reflected beams. The apparatus then measures the optical-path difference (optical-distance difference) between the two reflected beams on the basis of interference fringes produced by the beams. There are various ways of accomplishing these functions, including using an optical dividing technique and an optical-path arrangement technique. Apparatus for implementing these techniques include the Watson type apparatus, the Linnik type apparatus, and the Mirau type apparatus.

According to the conventional double-beam interferometer, when white light is supplied, a range in which a distance to a reference surface dr is equal to a distance to a surface ds to be measured is formed as a zero-order interference fringe, and its position is visually recognized as such. Subsequently, filters are switched, and a monochromatic light is supplied to the double-beam interferometer, and an image of interference fringes for viewing a step-height difference on the surface to be measured is produced. The step-height difference is measured by counting the number of monochromatic-light interference fringes positioned from the zero-order interference fringe to a point to be measured.

As described above, interference fringes caused by white light and interference fringes caused by monochromatic light are not simultaneously obtained. Thus, disadvantageously, a dynamic change (like a displacement on a surface to be measured) cannot be measured, and only static measurements, such as step-height difference measurements, can be performed.

SUMMARY OF THE INVENTION

Accordingly, it is an object of the present invention to provide a displacement measuring method and apparatus using two beams for enabling the measurement of a dynamic change such as a displacement on a surface to be measured.

To this end, according to an exemplary aspect of the present invention, a displacement measuring method is provided, comprising the steps of: dividing incident light into two beams, and then causing one beam to be reflected by a surface to be measured and causing another beam to be reflected by a reference surface; producing an image of interference fringes caused by light reflected by the surface to be measured and light reflected by the reference surface, the image of interference fringes including a simultaneously recorded monochromatic-light image and a chromatic-light image; detecting a position of a zero-order interference fringe based on a maximum brightness position of the chromatic-light image; and measuring the displacement of a position to be measured, based on the position of an interference fringe in the monochromatic-light image which corresponds to the position to be measured, and the position of an interference fringe in the monochromatic-light image which corresponds to the zero-order interference fringe.

Preferably, the incident light is composed of monochromatic light and chromatic light obtained by using filters to optically divide light from a single light source. Alternatively, the monochromatic-light image and the chromatic-light image can be obtained by using filters to optically divide the image of interference fringes caused by the light reflected by the surface to be measured and the light reflected by the reference surface.

According to another aspect of the present invention, the foregoing object has been achieved through provision of a displacement measuring apparatus comprising: a single light source; a mechanism for using filters to optically divide light from the light source into monochromatic light and chromatic light; a two-beam interference optical system for dividing each of the monochromatic light and chromatic light input in parallel into first and second beams, and then causing the first beam to be reflected by a surface to be measured and causing the second beam to be reflected by a reference surface; a mechanism for obtaining and simultaneously photographing a monochromatic-light image and a chromatic-light image which provide an image of interference fringes caused by the light reflected by the surface to be measured and the light reflected by the reference surface; a mechanism for detecting the position of a zero-order interference fringe based on the maximum brightness position of the chromatic-light image; and a mechanism for measuring the displacement of a position to be measured, based on the position of an interference fringe in the monochromatic-light image which corresponds to the position to be measured, and the position of an interference fringe in the monochromatic-light image which corresponds to the zero-order interference fringe.

According to a further aspect of the present invention, the foregoing object has been achieved through provision of a displacement measuring apparatus comprising: a single light source; a two-beam interference optical system for dividing light from the one light source into first and second beams, and then causing the first beam to be reflected by a surface to be measured and causing the second beam to be reflected by a reference surface; a mechanism for obtaining an image of interference fringes caused by light reflected by the surface to be measured and light reflected by the reference surface; a mechanism for using filters to optically divide the image of interference fringes into a monochromatic-light image and a chromatic-light image; a mechanism for detecting the position of a zero-order interference fringe based on the maximum brightness position of the monochromatic-light image; and a mechanism for measuring the displacement of a position to be measured, based on the position of an interference fringe in the monochromatic-light image which corresponds to the position to be measured, and the position of an interference fringe in the monochromatic-light image which corresponds to the zero-order interference fringe.

In the present invention, the monochromatic-light image is composed of light having a single wavelength, and the chromatic-light image is composed of light having a plurality of wavelengths.

For example, a color image is used as the chromatic-light image. This is because red (R), green (G) and blue (B) charge-coupled devices (CCDs) are used to perform separation into R, G and B monochromatic-light images. In the case where the separation is not performed, a monochromatic image is formed. In the case of the monochromatic-light image, although precision is inferior to that in the chromatic-light image case, a zero-order interference fringe can be found using the monochromatic-light image.

Preferably, intensity information regarding light having wavelength bands that do not overlap is obtained, and one of these bands has a high monochrome level (narrow wavelength band). Accordingly, in the case where the CCDs originally have strong monochrome photoreceiving characteristics, the monochrome level does not need to be enhanced. By dividing output light and filtering each divided ray, information obtained by monochrome CCDs can be thus used.

According to the present invention, the image of interference fringes is obtained as a monochromatic-light image and a chromatic-light image which are simultaneously photographed. In addition, the position of a zero-order interference fringe is detected based on the maximum brightness in the chromatic-light image, and a displacement on a surface to be measured is found based on the position of an interference fringe in the monochromatic-light image which corresponds to a point to be measured, and the position corresponding to the zero-order interference fringe. Thereby, dynamic displacement measurement, can be performed readily performed.

BRIEF DESCRIPTION OF THE DRAWINGS

The foregoing, and other, objects, features and advantages of the present invention will be more readily understood upon reading the following detailed description in conjunction with the drawings in which.

DESCRIPTION OF THE PREFERRED EMBODIMENTS

Figure 1:
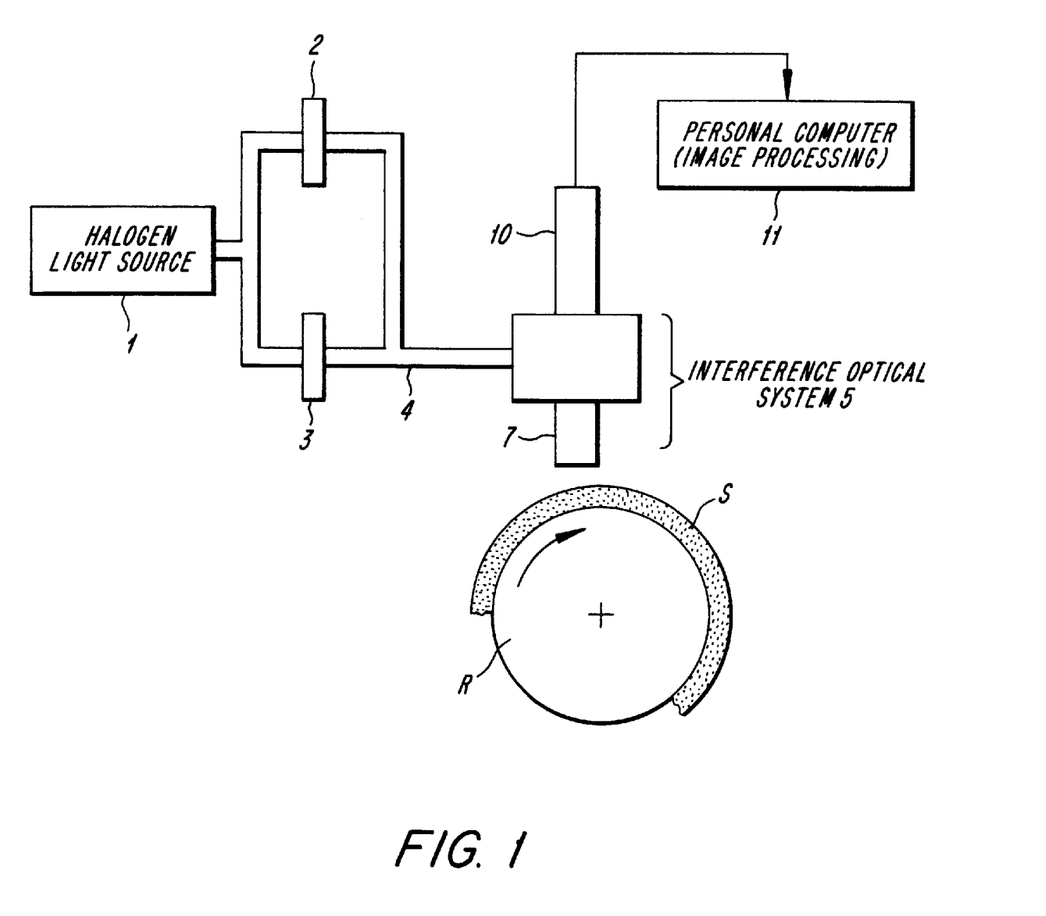
FIG. 1 is a block diagram showing a displacement measuring apparatus according to a first exemplary embodiment of the present invention.

FIG. 1 shows a displacement measuring apparatus according to a first embodiment of the present invention. In the first embodiment, a surface S to be measured is formed by coating a roll R with, for example, ceramic slurry. The surface, however, is not limited to a ceramic slurry.

A light source 1 is, for example, a halogen light source that emits white light. The light from the light source is input to an interference optical system 5 via filters 2 and 3. The filter 2 is an interference filter that allows, for example, only green light having a wavelength of 548 nm and a half-width of 2 nm to pass through it, while the filter 3 is a magenta filter that excludes green light having, e.g., a wavelength of 500 to 600 nm. The rays having passed through the filters 2 and 3 are passed to the interference optical system 5 by an optical fiber 4 or the like.

Figure 2:
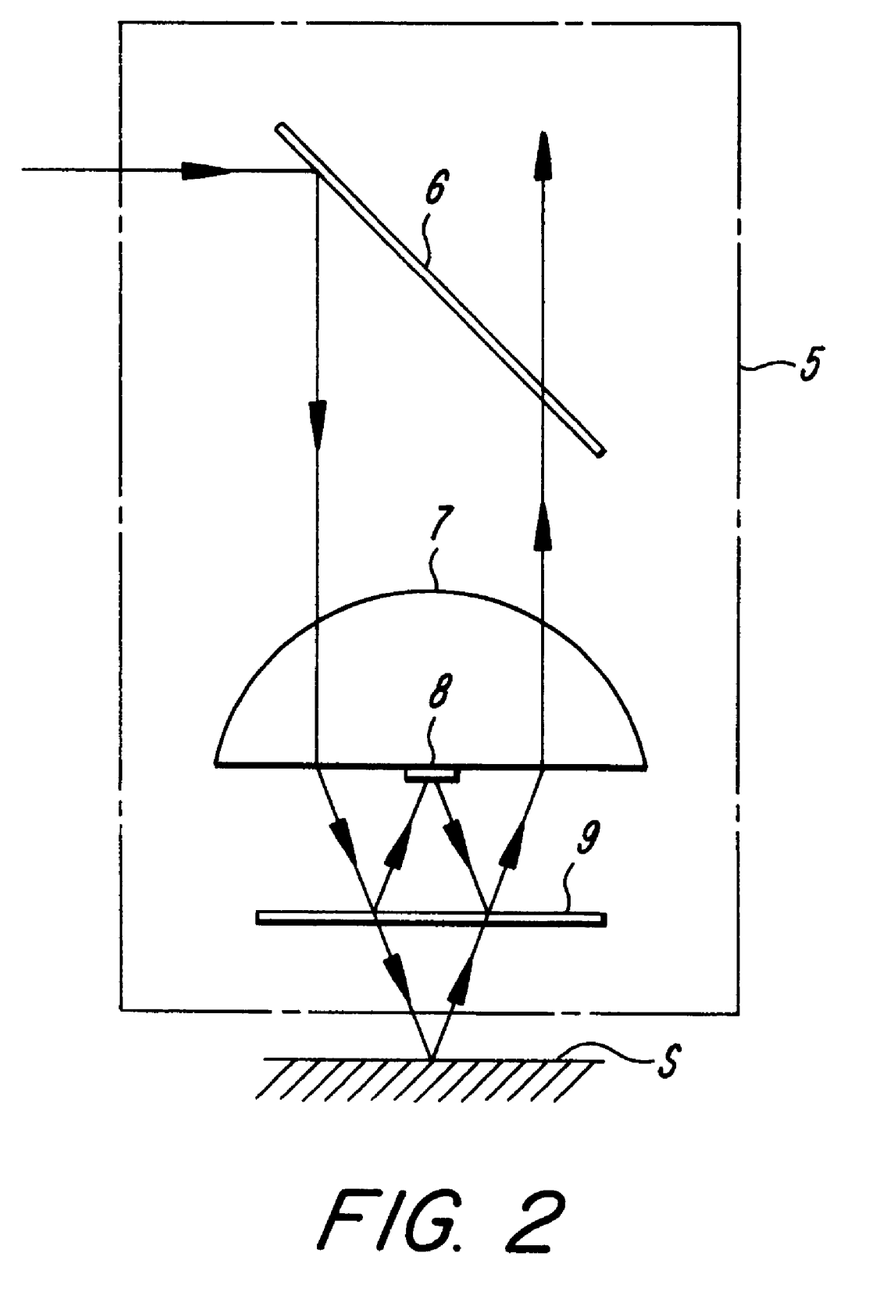
FIG. 2 is a detailed drawing of an interference optical system in the displacement measuring apparatus shown in FIG. 1.

The interference optical system 5 is a known Mirau interference optical system, and includes a reflector 6 and an interference objective lens 7 as shown in FIG. 2. The objective lens 7 has a reference reflector 8 as a reference surface in the center of one side. In the middle of the distance between the objective 7 and the surface S, there is disposed a semitransparent mirror (beam splitter) 9. The rays having passed through the filters 2 and 3 are divided into two beams having the same intensity. One beam is reflected by the reference reflector 8, and another beam is reflected by the surface S. The two reflected beams interfere to form interference fringes. The interference fringes are photographed by a CCD camera 10 disposed above the interference optical system 5. The CCD camera 10 obtains images (intensity information) composed of light having R, G and B wavelengths. The photographed data is sent to an image processor 11 such as a personal computer.

Figure 3:
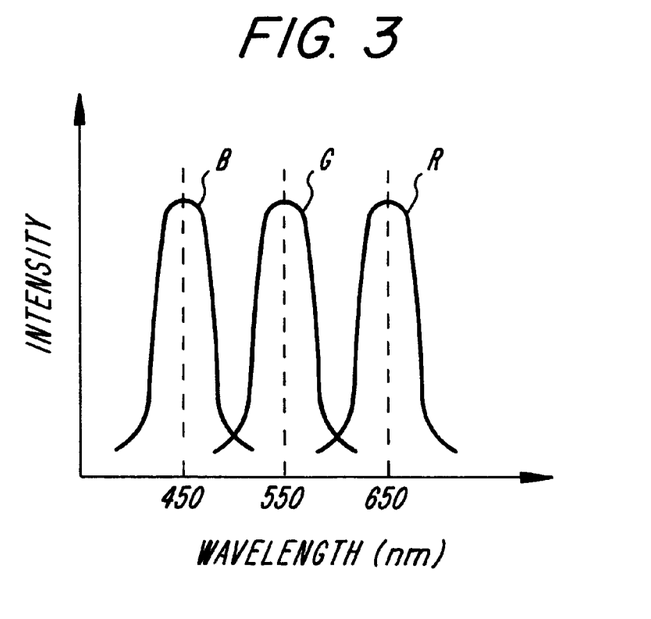
FIG. 3 is a graph showing the photoreceiving characteristics of RGB CCD cameras.
Figure 4:
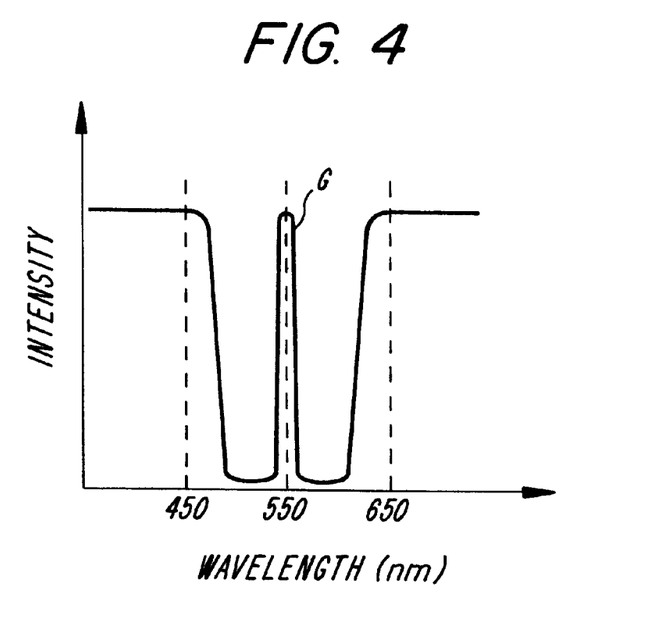
FIG. 4 is a graph showing the spectrum of incident light.

In general, the RGB CCD camera 10 has low monochrome characteristics as photoreceiving characteristics, as shown in FIG. 3 (that is, the R, G and B photoreceiving ranges are wide). However, by causing the input light to pass through the filters 2 and 3, the input light has characteristics as shown in FIG. 4, and an image of green light received by the CCD camera 10 is very monochromatic. Therefore, from the color image, a sharp-green image can be easily extracted.

Figure 5:
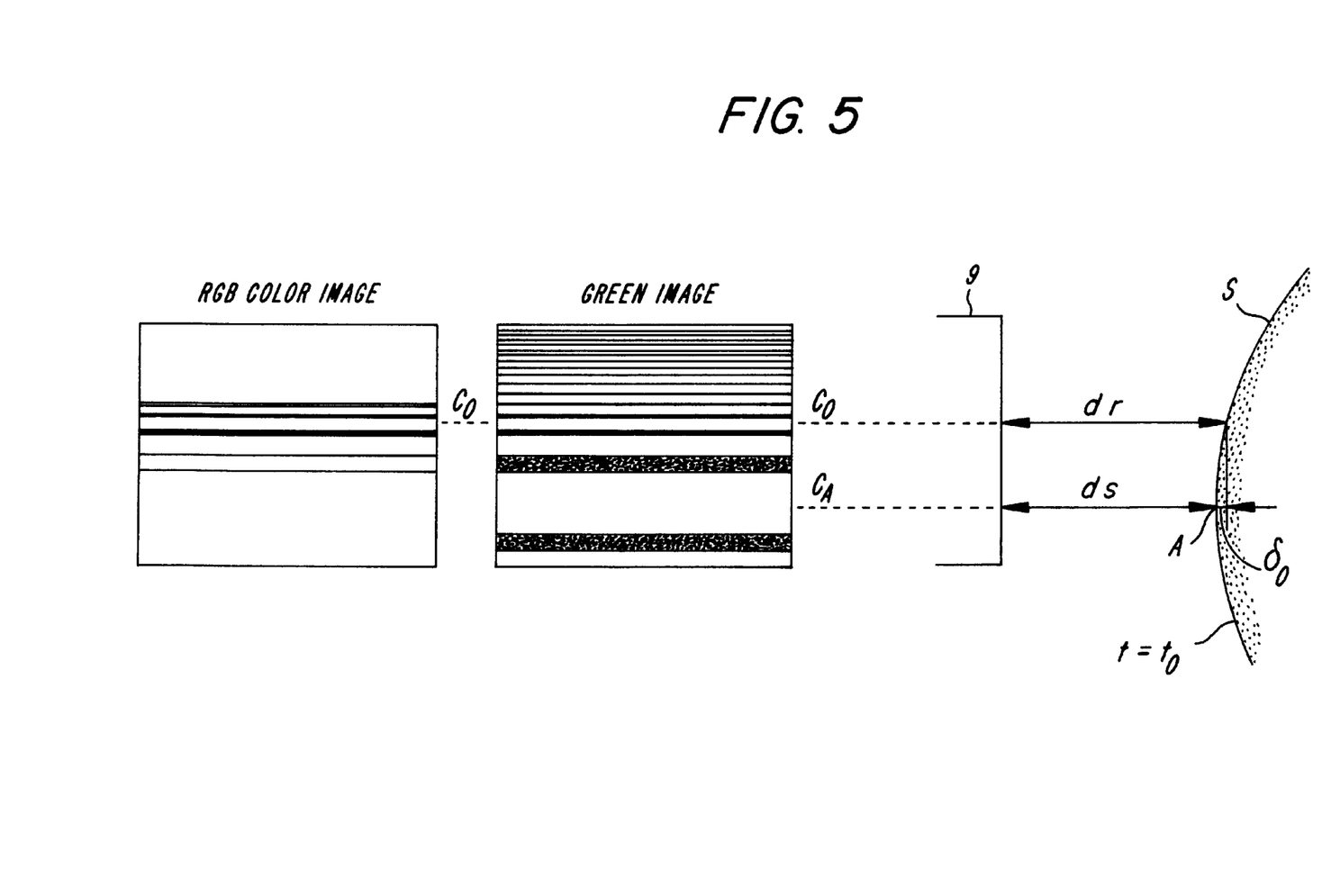
FIG. 5 is a drawing of a color interference-fringe image and a green interference-fringe image obtained at time $t_0$ by the displacement measuring apparatus shown in FIG. 1.
Figure 6:
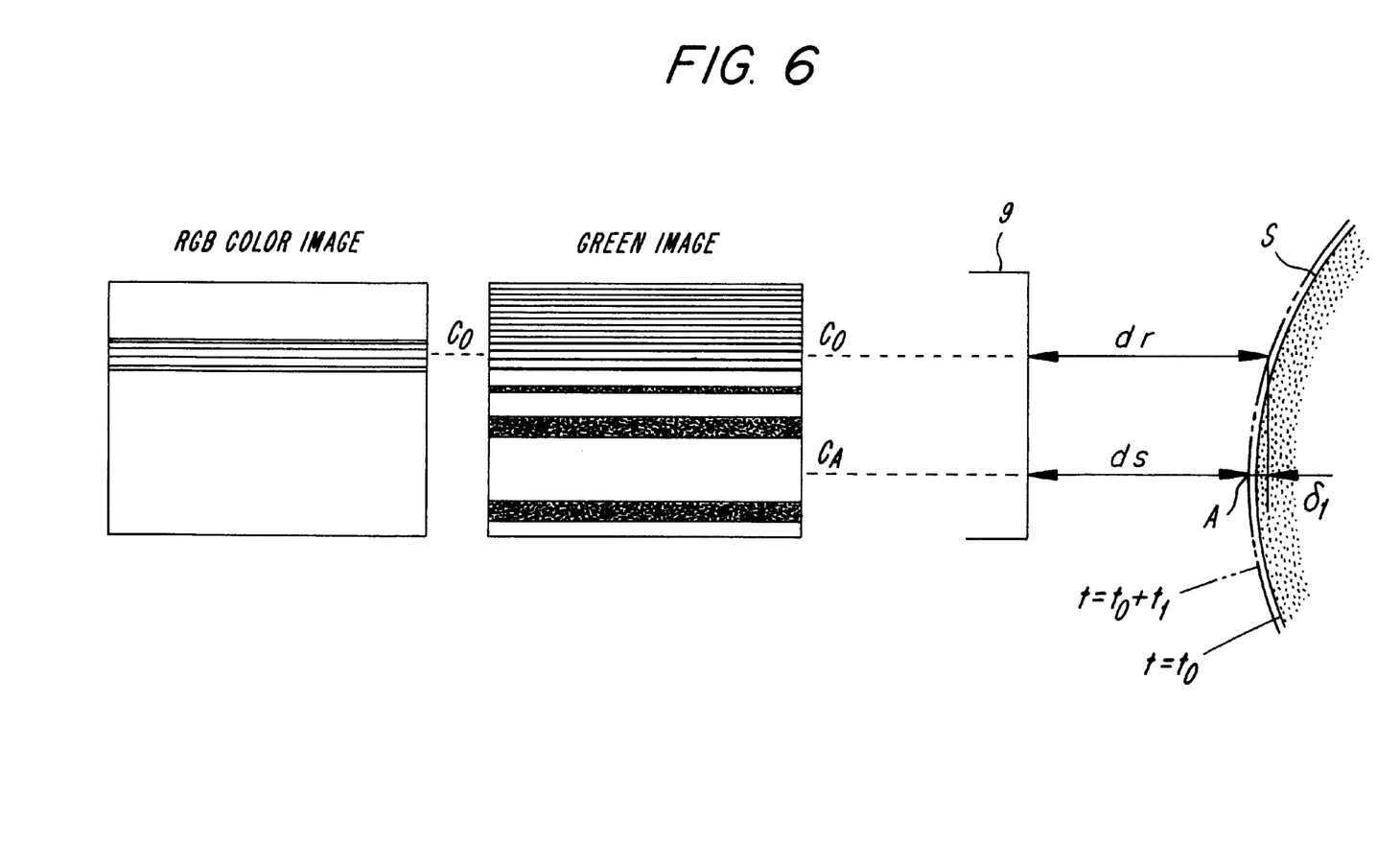
FIG. 6 is a drawing of a color interference-fringe image and a green interference-fringe image obtained after $t_1$ seconds from a point of time $t_0$ by the displacement measuring apparatus shown in FIG. 1.

A displacement measuring method of the present invention will be described with reference to FIGS. 5 and 6. FIG. 5 shows an RGB color image and a green image that are obtained at time $t=t_0$. FIG. 6 shows an RGB color image and a green image that are obtained after $t_1$ seconds from time $t_0$. In the green images, white lines represent green, and black lines represent black.

When the distance from the beam splitter 9 to the surface S is represented by ds, and the distance from the beam splitter 9 to the reference surface 8 is represented by dr (=constant), interference fringes, caused by the color image photographed by the CCD camera 10, are observed within approximately ds=dr because the input light does not have monochromatic wavelengths. In the position of the surface S that has ds=dr, interference (center burst) mutually enhanced by the wavelengths of the three colors (R, G and B) is generated. Thus, this maximum brightness position is detected as the position of a zero-order interference fringe $C_0$. In the green image, clear interference fringes can be formed not only in the range of dr=ds but also in its vicinity because the green image consists of single-wavelength light, which is different from the multi-color image. The interval among the interference fringes is half the green light wavelength, namely, approximately 274 nm.

Here, using the position of the zero-order interference fringe $C_0$ in the green image at time $t_0$ and the position of an interference fringe $C_A$ corresponding to a position A to be measured, displacement (step-height difference) $\delta_0$ between the surface S and the reference surface 8 is measured. In FIG. 5, there are two interference fringes between the position of the zero-order interference fringe and the position A. Thus, the displacement $d_0=2\times274$ nm=548 nm.

Next, using the RGB color image and the green image obtained after $t_1$ seconds, the displacement (step-height difference) $d_1$ between the surface S and the reference surface 8 is similarly measured. In other words, in FIG. 6, there are four interference fringes between the zero-order interference fringe $C_0$ and the interference fringe $C_A$ corresponding to the position A. Thus, the displacement $d_1$=4× 274 nm=1096 nm.

Therefore, the displacement of the position A during $t_1$ seconds is $d_1-d_0$=548 nm. In other words, it is found that the position A is displaced by 548 nm as measured from the beam splitter 9.

By using the CCD camera 10 to sequentially photograph and analyze the image of the interference fringes in the above manner, a temporal displacement of the position A on the surface S can be traced and recorded for analysis.

Figure 7:
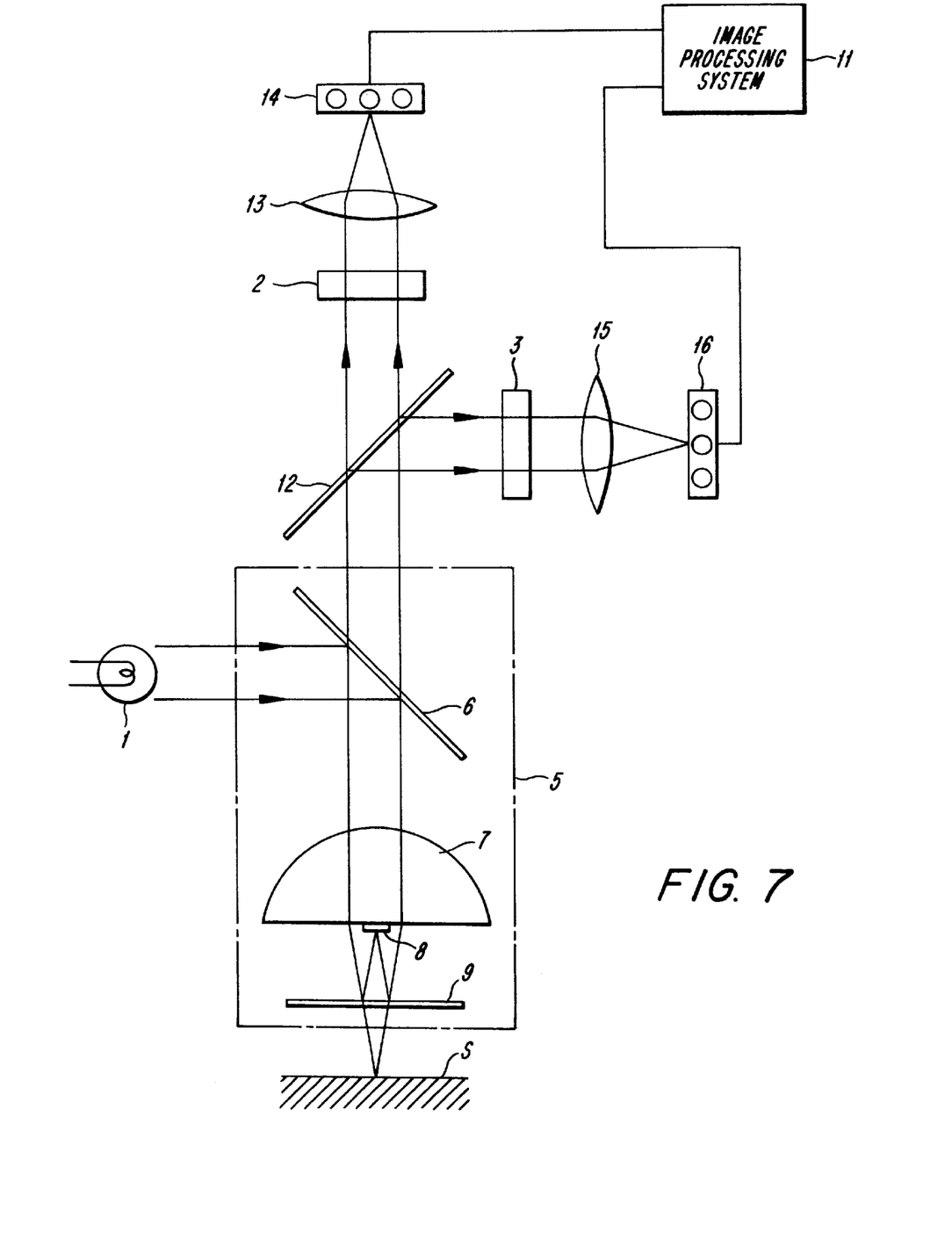
FIG. 7 is a block diagram showing a displacement measuring apparatus according to a second exemplary embodiment of the present invention.

FIG. 7 shows a displacement measuring apparatus according to a second embodiment of the present invention. Components identical to those in the first embodiment are denoted by the same reference numerals so that the same description is omitted.

In the second embodiment, light including the image of interference fringes, output from an interference optical system 5, is divided into two beams. One beam is incident on an interference filter 2, and the interference filter 2 allows only a green light component to pass through it. The green light component passes through a condensing lens 13, and is photographed by a CCD camera 14. Another beam is incident on a magenta filter 3, and the magenta filter 3 allows a chromatic light component excluding a green light component to pass through it. The chromatic light component passes through a condensing lens 15, and is photographed by a CCD camera 16. The data obtained by the CCD cameras 14 and 16 are sent to an image processor 11.

In the second embodiment, incident light is not optically divided into a monochromatic beam and a chromatic beam as shown in FIG. 1, but light reflected by an object to be measured is optically divided into a monochromatic beam and a chromatic beam. Accordingly, the monochromatic-light image from the CCD camera 14, and the chromatic light image from the CCD camera 16 can be obtained.

In the foregoing embodiments, a monochromatic-light image and a chromatic light image are obtained using filters. However, monochromatic and chromatic images of interference fringes can be obtained by image processing without the use of filters. For example, by extracting from chromatic images of interference fringes an image in which a predetermined wavelength ratio holds, a displacement may be obtained using the image. In this case, other light is to some extent mixed in a monochromatic-light image.

In the foregoing embodiments, a Mirau interference optical system is used. However, the interference optical system is not limited to this type of device; other known interference optical systems, such as a Watson type and a Linnik type optical systems, can be used.

Although green light is used as monochromatic light, the apparatus need not use green light. For instance, red or blue light can be used.

Concerning a measurement surface which is investigated, one that has mirror reflective characteristics by which light is not scattered and that does not absorb predetermined-wavelength light can be measured. Accordingly, the surface to be measured is not limited to a ceramic-slurry coat on a roll.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A displacement measuring method, comprising the steps of:

dividing incident light into a first and second beams;

causing the first beam to be reflected by a surface to be measured and causing said second beam to be reflected by a reference surface;

producing an image of interference fringes caused by light reflected by said surface to be measured and light reflected by said reference surface, said image of interference fringes including a monochromatic-light image and a chromatic-light image which are simultaneously photographed;

detecting a position of a zero-order interference fringe based on a maximum brightness position of said chromatic-light image; and measuring the displacement of a position to be measured, based on the position of an interference fringe in said monochromatic-light image which corresponds to the position to be measured, and the position of an interference fringe in said monochromatic-light image which corresponds to the zero-order interference fringe.

2. A displacement measuring method according to claim 1, wherein said incident light is composed of monochromatic light and chromatic light obtained by using filters to optically divide light from a single light source.

3. A displacement measuring method according to claim 1, wherein said monochromatic-light image and said chromatic-light image are obtained by using filters to optically divide the image of interference fringes caused by the light reflected by said surface to be measured and the light reflected by said reference surface.

4. A displacement measuring apparatus comprising:

a single light source;

means for using filters to optically divide light from said light source into monochromatic light and chromatic light;

a two-beam interference optical system for dividing each of the monochromatic light and chromatic light input in parallel into first and second beams, and then causing the first beam to be reflected by a surface to be measured and causing the second beam to be reflected by a reference surface;

means for obtaining and simultaneously photographing a monochromatic-light image and a chromatic-light image which provide an image of interference fringes caused by the light reflected by said surface to be measured and the light reflected by said reference surface;

means for detecting the position of a zero-order interference fringe based on the maximum brightness position of said chromatic-light image; and means for measuring the displacement of a position to be measured, based on the position of an interference fringe in said monochromatic-light image which corresponds to said position to be measured, and the position of an interference fringe in said monochromatic-light image which corresponds to the zero-order interference fringe.

5. A displacement measuring apparatus comprising:

a single light source;

a two-beam interference optical system for dividing light from said one light source into first and second beams, and then causing the first beam to be reflected by a surface to be measured and causing the second beam to be reflected by a reference surface;

means for using filters to optically divide an image of interference fringes into a monochromatic-light image and a chromatic-light image;

means for obtaining the monochromatic-light image and the chromatic-light image;

means for detecting the position of a zero-order interference fringe based on the maximum brightness position of said chromatic-light image; and means for measuring the displacement of a position to be measured, based on the position of an interference fringe in said monochromatic-light image which corresponds to said position to be measured, and the position of an interference fringe in said monochromatic-light image which corresponds to the zero-order interference fringe.

6. A displacement measuring method according to claim 1, wherein said surface to be measured comprises a ceramic slurry.

7. A displacement measuring apparatus according to claim 4, wherein said surface to be measured comprises a ceramic slurry.

8. A displacement measuring apparatus according to claim 5, wherein said surface to be measured comprises a ceramic slurry.

9. A displacement measuring method according to claim 2, wherein said filters comprise a first filter which passes only a prescribed color component, and a second filter which excludes said color component.

10. A displacement measuring method according to claim 3, wherein said filters comprise a first filter which passes only a prescribed color component, and a second filter which excludes said color component.

11. A displacement measuring apparatus according to claim 4, wherein said filters comprise a first filter which passes only a prescribed color component, and a second filter which excludes said color component.

12. A displacement measuring apparatus according to claim 5, wherein said filters comprise a first filter which passes only a prescribed color component, and a second filter which excludes said color component.

13. A displacement measuring method of claim 1, wherein said monochromatic-light image and said chromatic-light image are simultaneously photographed by receiving said images on an RGB CCD element, wherein one of the bands, R, G or B, has a high monochrome level.

14. A displacement measuring apparatus of claim 4, wherein said monochromatic-light image and said chromatic-light image are simultaneously photographed by receiving said images on an RGB CCD element, wherein one of the bands, R, G or B, has a high monochrome level.

* * * * *